(12) United States Patent
Hepworth et al.

(10) Patent No.: US 7,072,974 B2
(45) Date of Patent: Jul. 4, 2006

(54) EXTENSIBLE APPLICATION INTERFACE USING MACHINE-READABLE GRAPHICAL CODES

(75) Inventors: Paul J. Hepworth, Riverton, UT (US); Dimitri V. Yatsenko, Sandy, UT (US); Darren P. Smith, Orem, UT (US)

(73) Assignee: The Code Corporation, Draper, UT (US)

( * ) Notice: Subject to any disclaimer, the term of this patent is extended or adjusted under 35 U.S.C. 154(b) by 989 days.

(21) Appl. No.: 10/006,439

(22) Filed: Nov. 20, 2001

(65) Prior Publication Data

US 2002/0144017 A1 Oct. 3, 2002

Related U.S. Application Data

(60) Provisional application No. 60/279,356, filed on Mar. 27, 2001.

(51) Int. Cl.
*G06F 15/16* (2006.01)
*G06F 3/00* (2006.01)

(52) U.S. Cl. .......................... 709/236; 709/228; 710/30

(58) Field of Classification Search ................ 709/201, 709/202, 203, 206, 207, 217, 236, 245, 228; 707/1, 10, 100, 30
See application file for complete search history.

(56) References Cited

U.S. PATENT DOCUMENTS

| | | | |
|---|---|---|---|
| 3,513,320 A | 5/1970 | Weldon | 250/219 |
| 4,488,679 A | 12/1984 | Bockholt et al. | 235/469 |
| 4,654,718 A | 3/1987 | Sueyoshi | 358/257 |
| 4,752,675 A | 6/1988 | Zetmeir | 235/375 |
| 4,896,029 A | 1/1990 | Chandler et al. | 235/494 |
| 4,958,064 A | 9/1990 | Kirkpatrick | 235/384 |
| 4,998,010 A | 3/1991 | Chandler et al. | 235/494 |
| 5,047,614 A | 9/1991 | Bianco | 235/385 |
| 5,113,445 A | 5/1992 | Wang | |
| 5,153,418 A | 10/1992 | Batterman et al. | 235/494 |
| 5,159,635 A | 10/1992 | Wang | |
| 5,189,292 A | 2/1993 | Batterman et al. | 235/494 |
| 5,223,701 A | 6/1993 | Batterman et al. | 235/494 |

(Continued)

FOREIGN PATENT DOCUMENTS

EP 0837406 A2 4/1998

(Continued)

OTHER PUBLICATIONS

"Punched Cards to Bar Codes," Benjamin Nelson, Helmers Publishing, Inc. 1997, pp. 1-16.

(Continued)

*Primary Examiner*—Paul H. Kang
(74) *Attorney, Agent, or Firm*—Madson & Austin

(57) ABSTRACT

A system is disclosed for providing data from a graphical code reading device to a software module. The system includes a graphical code reading device that scans a graphical code and provides graphical code data. A computer is in electronic communication with the graphical code reading device and receives the graphical code data from the graphical code reading device. The computer includes a processor, a memory in electronic communication with the processor and a communications port in electronic communication with the processor for communicating with the graphical code reading device. An association may include a data type and a software module identifier. A driver is used to receive the graphical code data and obtain the software module identifier through use of the data type to provide the graphical code data to the software module identified by the software module identifier.

98 Claims, 8 Drawing Sheets

U.S. PATENT DOCUMENTS

| | | | |
|---|---|---|---|
| 5,343,028 A | 8/1994 | Figarella et al. | 235/462 |
| 5,352,878 A | 10/1994 | Smith et al. | 235/462 |
| 5,412,196 A | 5/1995 | Surka | 235/462 |
| 5,428,211 A | 6/1995 | Zheng et al. | 235/462 |
| 5,438,188 A | 8/1995 | Surka | 235/462 |
| 5,465,291 A | 11/1995 | Barrus et al. | 379/67 |
| 5,478,999 A | 12/1995 | Figarella et al. | 235/462 |
| 5,483,052 A | 1/1996 | Smith, III et al. | 235/472 |
| 5,493,105 A | 2/1996 | Desai | 235/375 |
| 5,545,887 A | 8/1996 | Smith et al. | 235/462 |
| 5,604,640 A | 2/1997 | Zipf et al. | 359/803 |
| 5,612,527 A | 3/1997 | Ovadia | 235/383 |
| 5,804,803 A | 9/1998 | Cragun et al. | 235/375 |
| 5,835,615 A | 11/1998 | Lubow et al. | |
| 5,850,080 A | 12/1998 | Herzig | |
| 5,853,252 A | 12/1998 | Wright et al. | |
| 5,869,819 A | 2/1999 | Knowles et al. | 235/375 |
| 5,903,729 A | 5/1999 | Reber et al. | 395/200.49 |
| 5,905,248 A | 5/1999 | Russell et al. | 235/462 |
| 5,905,251 A | 5/1999 | Knowles | 235/472.01 |
| 5,933,634 A | 8/1999 | Enokido et al. | |
| 5,933,829 A | 8/1999 | Durst et al. | 707/10 |
| 5,938,726 A | 8/1999 | Reber et al. | 709/217 |
| 5,938,727 A | 8/1999 | Ikeda | |
| 5,978,773 A | 11/1999 | Hudetz et al. | 705/23 |
| 5,984,193 A | 11/1999 | Uhling | |
| 5,992,752 A | 11/1999 | Wilz, Sr. et al. | 235/472.01 |
| 6,012,102 A | 1/2000 | Shachar | |
| 6,027,024 A | 2/2000 | Knowles | 235/472.01 |
| 6,032,195 A | 2/2000 | Reber et al. | 709/245 |
| 6,068,188 A | 5/2000 | Knowles | 235/462.01 |
| 6,076,733 A | 6/2000 | Wilz, Sr et al. | 235/462.01 |
| 6,098,106 A | 8/2000 | Philyaw et al. | |
| 6,108,656 A | 8/2000 | Durst et al. | 707/10 |
| 6,138,151 A | 10/2000 | Reber et al. | 709/219 |
| 6,154,738 A | 11/2000 | Call | 707/4 |
| 6,247,646 B1 | 6/2001 | Iwaguchi et al. | |
| 6,377,986 B1 | 4/2002 | Philyaw et al. | |
| 6,384,744 B1 | 5/2002 | Philyaw et al. | |
| 6,535,883 B1 | 3/2003 | Lee et al. | |
| 6,564,249 B1 | 5/2003 | Shiigi | |
| 6,581,838 B1 * | 6/2003 | Meksavan et al. | 235/462.46 |
| 6,584,601 B1 | 6/2003 | Kodosky et al. | |
| 6,601,772 B1 | 8/2003 | Rubin et al. | |
| 6,834,803 B1 | 12/2004 | Schuessler | |
| 2002/0147743 A1 | 10/2002 | Le et al. | |
| 2003/0088643 A1 | 5/2003 | Shupps et al. | |

FOREIGN PATENT DOCUMENTS

| | | |
|---|---|---|
| WO | WO98/03923 | 1/1998 |
| WO | WO98/06055 | 2/1998 |
| WO | WO98/24036 | 6/1998 |
| WO | WO98/40823 | 9/1998 |
| WO | WO98/49813 | 11/1998 |
| WO | WO99/04326 | 1/1999 |

OTHER PUBLICATIONS

"MiniCode," http://www.omniplanar.com/minicode.html, pp. 1-10, May 17, 1999.

* cited by examiner

EXTENSIBLE APPLICATION INTERFACE USING MACHINE-READABLE GRAPHICAL CODES

RELATED APPLICATIONS

This application is related tog and claims priority from U.S. patent application Ser. No. 60/279,356 filed Mar. 27, 2001, for "Extensible Application Interface Using Machine-Readable Graphical Codes," with inventors Paul Hepworth, Dimitri Yatsenko and Darren Smith, which is incorporated herein by reference.

BACKGROUND OF THE INVENTION

1. Field of the Invention

The present invention relates generally to the field of graphical-code reading computer systems. More specifically, the present invention relates to a system and method for providing information from machine-readable graphical codes to applications on a computer system.

2. Description of the Related Art

Computer technology has entered many areas to simplify manual tasks and to make information more readily available. Most people use several computer programs every day that greatly simplify their work day. In addition, through the use of a computer, vast amounts of information are readily available. Computer software and electronic information sources are typically found on storage media or storage devices such as hard drives, CD-ROMs, DVD-ROMs, etc., on a local computer, on a local computer network or a global computer network, such as the Internet.

Computer programs can be used for many purposes including assisting a person in performing his or her job. For example, word processors help computer users prepare documents, spreadsheet programs help users perform accounting functions and numerical analysis, diagnostic programs assist users in diagnosing problems, etc. There are many programs available to help users with almost any need they may have. Generally, computer programs need some type of manual input to help a user, from simply starting the program to entering a significant amount of input.

Before a user can access relevant electronic information, he or she usually needs to enter some input before helpful information becomes available. By way of example, many computer users, when looking for particular information, will use the World Wide Web (the "Web") to find information. Typically users will begin their search for information by using a search engine on the Web. To perform a search, a user first enters one or more search terms. Typically, a user will then browse the results by clicking on various links and reading through the information found. After some manual browsing, the user often finds the relevant information. Finding and accessing electronic information from a CD-ROM or from a hard drive is similar in that some manual searching and browsing of data is required.

Usually computer programs and/or electronic information relates to a particular product, item or task. As illustrated, the computer user often needs to provide input to use the program or to access the information. For example, the particular product, item or task may require a user to start a particular computer program, access certain electronic information, enter particular input using the keyboard or mouse, complete an online form, etc. It would be beneficial if means were provided to enable more of the manual data entry and/or manual application launching to be achieved automatically.

BRIEF DESCRIPTION OF THE DRAWINGS

Non-exhaustive embodiments of the invention are described with reference to the figures, in which.

DETAILED DESCRIPTION

Figure 1:
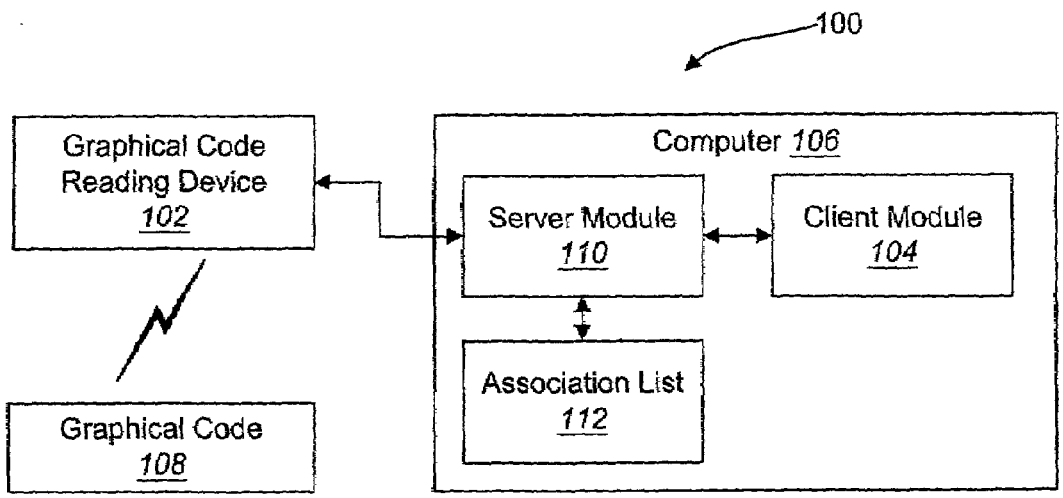
FIG. 1 is a block diagram of an embodiment of a system for providing data from a graphical code reading device to a software client module on a computer system.

A system is disclosed that includes a graphical code reading device that scans a graphical code and provides graphical code data. A computer is in electronic communication with the graphical code reading device and receives the graphical code data from the graphical code reading device. (The graphical code reading device may decode the data from the graphical code image and transmit the decoded data to the computer; or the reading device may transmit the image, and the computer may decode the data from the image.) The computer may include a processor, a memory in electronic communication with the processor and a communications port in electronic communication with the processor for communicating with the graphical code reading device. An association may include a data type and a software module identifier. A driver may be used to receive the graphical code data and obtain the software module identifier through use of the data type to provide the graphical code data to the software module identified by the software module identifier.

In one embodiment the association is included in an association list. The association list may be created statically or dynamically. The association list may include a number of data types and software module identifiers.

The graphical code data may have different formats depending on the particular embodiment. For example, the graphical code data may include a data field or multiple data fields.

Embodiments of the driver may also include a server module. The server module operates to receive the graphical code data and determine a data type of the graphical code data. Using the data type the server module may obtain the software module identifier from the association. If the software module identified by the software module identifier is not running, the software module may be launched. The graphical code data may be provided to a client module of the software module.

Also disclosed is a method for providing data from a graphical code reading device to a software module. Graphical code data is received from a graphical code reading device in electronic communication with a computer and the data type of the graphical code data is determined. A software module identifier is obtained through use of the data type and through use of an association list. If the software module identified by the software module identifier is not running, the software module may be launched. The graphical code data is then provided to the software module. A computer-readable medium is disclosed for storing program data where the program data comprises executable instructions for implementing the method.

In another embodiment, a system is disclosed for providing data from a graphical code reading device to a web page. An embodiment of the system includes a graphical code reading device that scans a graphical code and provides graphical code data. A computer is in electronic communication with the graphical code reading device and receives the graphical code data from the graphical code reading device. The computer may include a processor, a memory in electronic communication with the processor and a communications port in electronic communication with the processor for communicating with the graphical code reading device. An association may include a data type and a software module identifier. A driver may be used to receive the graphical code data and obtain the software module identifier through use of the data type. The driver may further provide the graphical code data to a browser extension module identified by the software module identifier. The browser extension module provides the graphical code data to the web page.

In an embodiment herein, the web page may include a form having form fields. Further, the graphical code data may include multiple data fields that correspond to the form fields such that the form is automatically completed.

In another embodiment, the driver provides the graphical code data to the browser extension module by having the driver send the graphical code data to a client module embedded in the browser extension module. Then the client module calls a browser extension callback function to pass the graphical code data to the browser extension module.

Also disclosed herein is a serialization process that may be used to avoid losing transactions. The serialization process may cause the driver to wait for a period of time. One method for timing the period of time is by causing the driver to wait until a message is sent from the client module to stop the wait.

Referring now to FIG. 1, there is shown an embodiment of a system 100 for providing data from a graphical code reading device 102 to a software client module 104 on a computer system 106. The computer 106 is in electronic communication with the graphical code reading device 102. The graphical code reading device 102 scans a graphical code 108 to obtain or provide graphical code data to the computer 106. Various types of graphical codes 108 may be used with systems and methods herein. For example, bar codes or matrix codes may be used as graphical codes 108.

Of course, any other graphical code 108 that may be scanned may be used with embodiments herein.

The graphical code reading device 102 may be connected to or integrated with the computer 106. If graphical code reading device 102 is connected to the computer 106, the connection may be wireless or wired, or may be continuous or intermittent.

The computer 106 shown in FIG. 1 may be a personal computer. Personal computers are commercially available and known by those skilled in the art. Components typically found in a computer 106 will be discussed below in relation to FIG. 9.

In operation, a server module 110 receives the graphical code data from the graphical code reading device 102 and sends the graphical code data to any client modules 104 that requested the data. The server module 110 may identify any requesting client modules 104 through use of an association list 112. The association list 112 will be more fully discussed below. Generally, the association list 112 includes a list of data types that may be received in the graphical code data. The association list 112 also includes a list of client modules 104 that have requested each data type so that when the server module 110 receives the graphical code data, it 1 10 may identify what client modules 104 have requested that data type by using the association list 112.

It will be appreciated by those skilled in the art that the inventive principles herein may be applied and implemented in a wide variety of ways. Different examples of such implementations will be shown through embodiments herein to illustrate the versatility of the present invention and that it may be used in many different embodiments all within the scope of the present invention.

Figure 2:
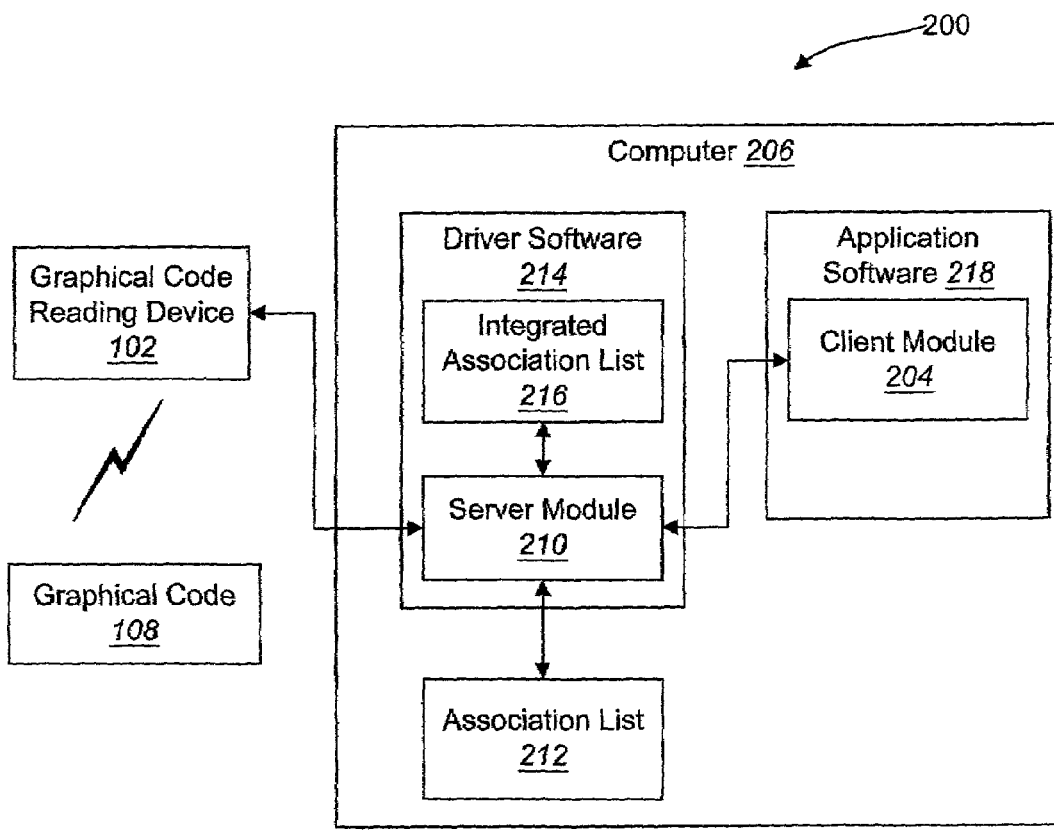
FIG. 2 is a block diagram of another embodiment of a system for providing data from a graphical code reading device to a software client module on a computer system.

FIG. 2 illustrates an embodiment where the server module 210 is included as part of driver software 214. The association list 112 may be embodied in various forms and in various ways. For example, as shown in FIG. 2, the driver software 214 may include an integrated association list 216 as well as the server module 210. In addition, the association list 212 may also be included in the embodiment 200. The association lists 212, 216 may be static or dynamic. The association lists 212, 216 are expandable and may be modified. New data types may be created and added to the association lists 212, 216 at any time making the system extensible. The lists 212, 216 may be based on tables and/or may be created or updated when applications are installed and/or when they are executed.

In the embodiment 200 shown in FIG. 2, the driver software 214 receives the graphical code data from the graphical code reading device 102 and sends the graphical code data to any client modules 204 that requested the data. The server module 210, as part of the driver software 214, identifies any requesting entities through use of the integrated association list 216 and/or the association list 212.

The client module 204 may be used in combination with, be part of, be linked to, or otherwise operate in conjunction with application software 218. The client module 204 may be embedded in the application 218 (e.g., statically linked to the application 218 or dynamically linked to the application).

The server module 210 may send the graphical code data to the client module 204. Alternatively, the server module 210 of the driver software 214 may send the graphical code data to the application software 218 that forwards the graphical code data to the client module 204. Those skilled in the art will appreciate that the graphical code data may be communicated to the client module 204 directly or indirectly. In the embodiment shown in FIG. 2, the client module 204 may communicate with the driver software 214 using standard interprocess communication techniques such as TCP sockets.

When a graphical code 108 is read, the driver software 214 receives the graphical code data and determines the appropriate application 218 to send the data to. The driver software 214 may launch the application 218 if it isn't already running. The driver software 214 may send the graphical code data to the client module 204 using interprocess communication techniques. The client module 204 receives the data over the socket and may call an application-defined function (not shown) that takes appropriate application-specific action.

Figure 3:
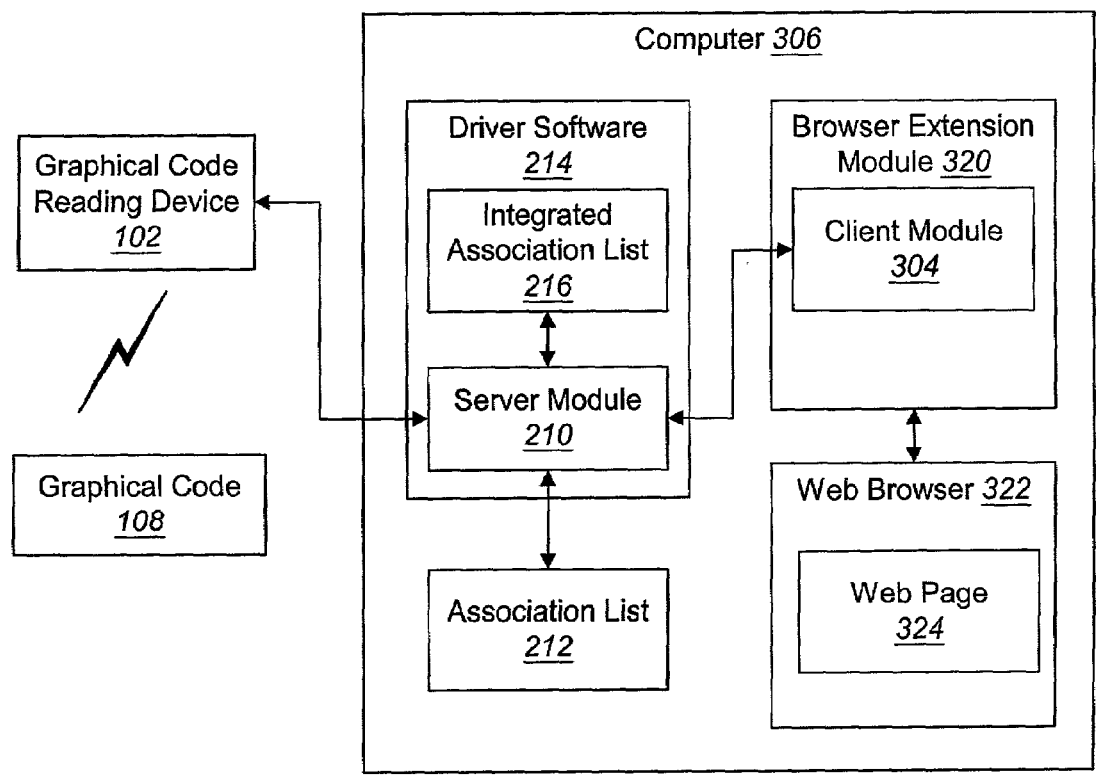
FIG. 3 is a block diagram of an embodiment of a system for providing data from a graphical code reading device to a web page.

Referring to FIG. 3, embodiments herein may also be used in combination with a web browser 322 and web pages 324. As shown, the client module 304 of the embodiment in FIG. 3 may be used in combination with a browser extension module 320. Browser extensions 320 are known by those skilled in the art.

The browser extension module 320 is used with the web browser to extend its capabilities or functionality. Typically the web browser 322 is used to display web pages 324. Browser extension modules 320 may add functionality to enable or to allow the display or processing of certain web pages. Examples of browser extension modules 320 are Netscape plugins, ActiveX controls, etc.

In the embodiment of FIG. 3, the client module 304 may be used to send graphical code data to web browser 322 and/or to a web page 324. For example, some web pages display forms and provide processing for the form. The client module 304 may receive data to fill out forms from web pages 324. For example, a manufacturer may provide support for a product through its web site. To obtain support, the manufacturer's web site may include a web page 324 with a form to complete. Through the use of the embodiment shown in FIG. 3, the user may simply scan a graphical code 108 to complete the form, rather than have to manually complete the form. The code 108 scanned may be placed on the product (not shown).

The graphical code reading device 102 provides graphical code data to the computer 306, and more particularly to the driver software 214. The server module 210 may receive the graphical code data and send it to the appropriate requesting software.

In order to receive the relevant graphical code data, the client module 304 may have notified the server module 210 of its request for any graphical code data relating to the product. As a result, when the graphical code data is provided to the server module 210, the server module 210 uses the integrated association list 216 and/or the association list 212 to ascertain where the data should be sent. From the lists 216, 212, the server module 210 determines that the graphical code data should be sent to the client module 304 used in combination with the browser extension module 320.

The client module 304 receives the graphical code data and processes the data and operates to complete the form provided by the web page 324 and web browser 322. To complete the form, the client module 304 may pass all of the graphical code data to the web page 324 at once, or it may pass portions of the graphical code data to the web page 324, as required. For example, if the form contained different fields, the client module 304 may provide the field data (from the graphical code data) to the web page 324 a field at a time. Of course, it will be appreciated by those skilled in the art that web pages 324 may include a variety of components that can be used to present or process a form including, but not limited to, scripts, Java, ActiveX, extensions, plugins, etc. Thus, the client module 304 may pass the fields to many different types of program code to complete the form processing.

In one embodiment, the web page 324 may include tags that activate the browser extension module 320. The browser extension module 320, or more specifically the client module 304 of the browser extension module 320, may communicate with the server module 210. Once the browser extension module 320 receives the graphical code data, it 320 may communicate the data to the web page 324 by calling script functions (not shown) contained within the web page. Thus, the embodiment illustrated in FIG. 3 may be used to fill out web forms, to select data, to retrieve data, to assist or facilitate electronic commerce transactions, etc.

The embodiment of FIG. 3 may easily be used with other extensible applications besides web browsers 322 and browser extension modules 320. The embodiment of FIG. 3 may more generally use an extensible application (not shown) along with application extension modules (not shown) in the same manner illustrated by the web browser 322 and browser extension module 320. For example, word processors, spreadsheets, multimedia presentation packages, etc., may be used as extensible applications. Those skilled in the art will appreciate that many other extensible applications may be used with the embodiments disclosed herein.

Figure 4:
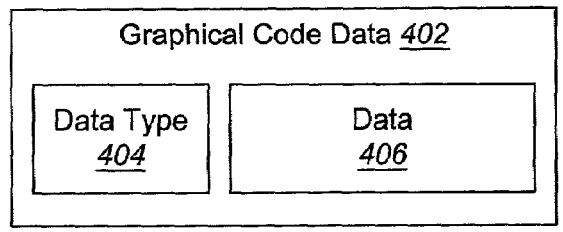
FIG. 4 is a block diagram of an embodiment of graphical code data.

Referring now to FIG. 4, the graphical code data 402 may have different formats. The graphical code data 402 may include a data type 404 indicating what type of data 406 is included in the graphical code data 402. FIG. 4 illustrates graphical code data 402 including one piece of data 406 and one data type 404 encoded along with the data 406.

Data type identifiers 404 may be text, numbers, etc. Some examples of possible data type identifiers 404 are as follows: first_name, last_name, addr1, addr2, ssn, URL, program, email, file, credit_card_expir, submit, clear, print, update, credit_card_num, 12, C43FE89A, 1020, 1021 and credit_card_type.

Data type identifiers 404 do not need to be defined in advance of when the driver software 214 or graphical code reading device 102 are produced. An application 218 or client module 204 may use many different identifiers 404. It is only necessary that the creators of the graphical codes 108 and the applications 218 and client modules 204 agree on the meaning of the type identifier.

Figure 5:
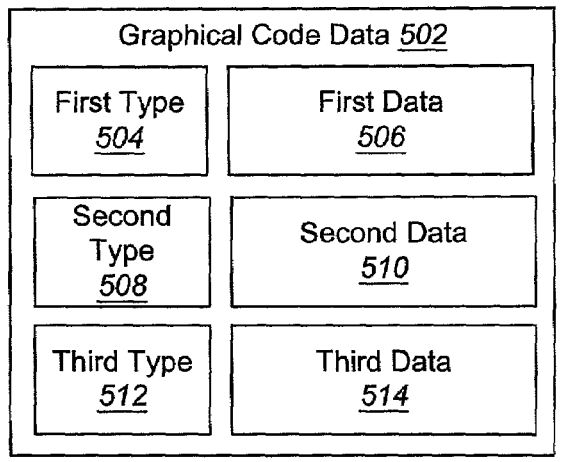
FIG. 5 is a block diagram of another embodiment of graphical code data.

FIG. 5 depicts graphical code data 502 that includes a plurality of data types and data. A first type 504 may indicate what type of data is included in the first data 506. A second type 508 may indicate what type of data is included in the second data 510, and a third type 512 may indicated what type of data is included in the third data 514, etc. The graphical code data 502 illustrated in FIG. 5 is an example of what graphical code data used in combination with a browser extension client module 304, as shown in FIG. 3, may include. The first type 504 and first data 506 may correspond to one field of a form of a web page 324. The second type 508 and second data 510 may correspond to a second field of the form of a web page 324, and so forth.

The graphical code data 502 of FIG. 5 illustrates that the different fields may be dispatched individually, each field going to a different application. Alternatively, and as discussed above, the fields may be dispatched together and be sent to the same application.

Figure 6:
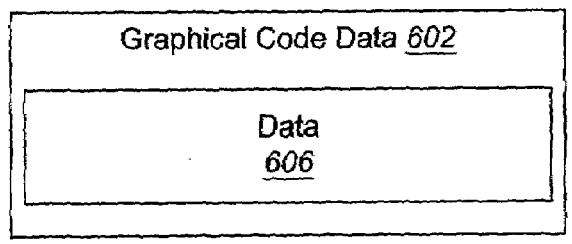
FIG. 6 is a block diagram of a further embodiment of graphical code data.

Of course, it will be appreciated by those skilled in the art that the graphical code data 602 may not have an embedded data type. As shown in FIG. 6, the graphical code data 602 may simply include the data 606. If this embodiment of graphical code data is used, the server module 110 may respond in a number of ways including, but not limited to, examining the data 606 to determine what type of data it is, assuming that the data 606 is of a particular data type, passing the data 606 on to another component, determining the data type according to the symbology of the graphical code, etc. In addition, the server module 110 may assume that the data 606 is of a single generic type or that it is of a type derived form the encoding format of the graphical code 108 (e.g., UPC, "code 39 text", etc.).

The server module 110 may examine the data 606 to determine what type of data it is. The server module 110 or driver 214 may use specific substrings, regular expressions or patterns in the data to infer a data type. For example, "www" or "http" may indicate a URL type, ".exe" may indicate a program type, ".txt" or ".doc" may indicate a document type, nnn-nn-nnnn may indicate a social security number type, etc. Those skilled in the art will appreciate the ways in which data may be examined to determine the data type.

Figure 7:
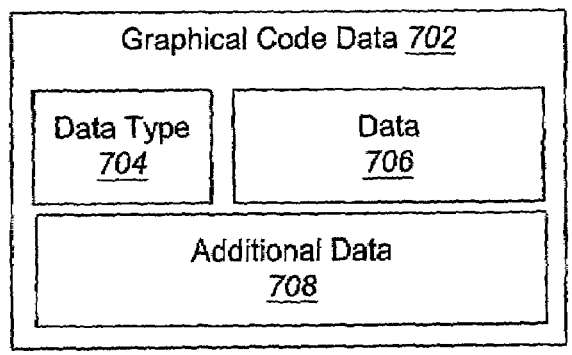
FIG. 7 is a block diagram of another embodiment of graphical code data.

FIG. 7 illustrates graphical code data 702 that includes both fields with data types and fields without data types. A data type 704 may be included to indicate what type of data 706 is included. Additional data 708 may also be included as part of the graphical code data 702. As shown, the additional data 708 may be included without an associated data type field. The server module 110 may be configured to handle the graphical code data 702 in a variety of ways. The server module 110 may assume that the additional data 708 is of the same type as indicated by data type 704. Alternatively, the server module 110 may assume that if an additional data 708 field is present, it is of a particular data type but not the same as the data type 704. Furthermore, the server module 110 may examine the additional data 708 to determine its type, may simply pass the additional data 708 to a particular client module 304, may save the additional data 708 until a later time when it may be correctly routed, etc. As shown, there are a number of ways in which the graphical code data may be formatted and processed.

Figure 8:
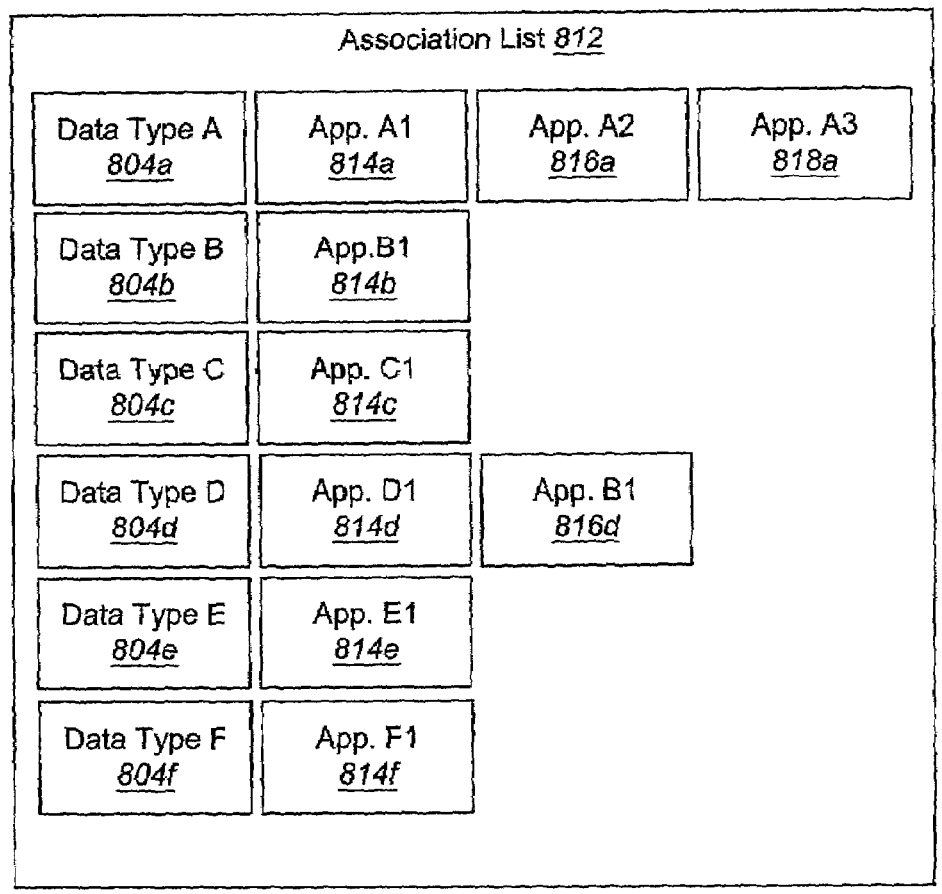
FIG. 8 is a block diagram of an embodiment of an association list.

FIG. 8 illustrates an embodiment of an association list 812. The association list 112, 212 and the integrated association list 216 may have the same format or may have different formats. In function, the association list 812 serves to indicate what data types should be sent to which components or applications. Those skilled in the art will appreciate how this may be implemented in different ways. The association list 812 illustrated herein includes a plurality of data types 804. With each data type 804 is listed software module identifier(s) identifying software components that have requested any graphical code data of that data type 804 be sent to it. As shown, application A1 814a, application A2 816a and application A3 818a have all requested that any graphical code data of type data type A 804a be sent to them. The application names 814, 816, 818, etc., may correspond to the client modules 104, 204, 304 or may correspond to an associated application (such as a browser extension module 320 or a web browser 322). Data type B 804b has been requested by application B1 814b. Data type C 804c has been requested by application C1 814c. Further, as shown, data type D 804d has been requested by application D1 814d and application B1 816d. As shown by application B1 814b, 816d, one application may request more than one data type. Finally, data types E and F 804e, 804f have been requested by applications E1 and F1 814e, 814f, respectively.

Figure 9:
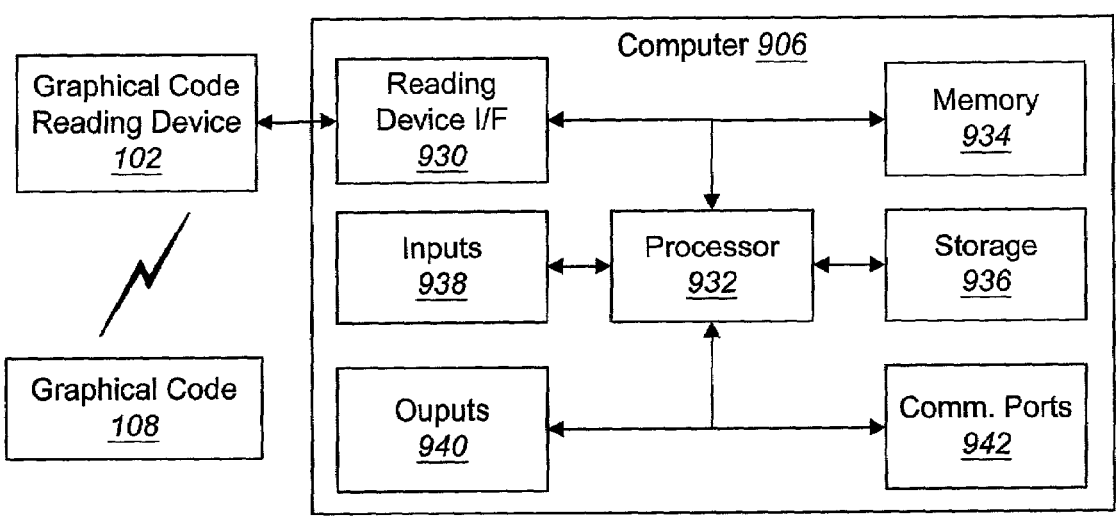
FIG. 9 is a block diagram of hardware components that may be used in an embodiment of a computer.

FIG. 9 is a block diagram of hardware components that may be used in an embodiment of a computer 906 used in combination with the graphical code is reading device 102. The computer 906 is used in combination with the graphical code reading device 102 to read in the graphical codes 108. The embodiment of the computer 906 shown in FIG. 9 communicates with the graphical code reading device 102 through the reading device interface 930. The reading device interface 930 may be a standard communications port typically found on a computer 906, or it may be a specialized interface card provided along with the graphical code reading device 102.

Many different types of computer systems may be used to implement the computer 906 illustrated herein. The diagram of FIG. 9 illustrates typical components of a computer 906 including a processor 932, memory 934, a storage device 936, an input device 938, and an output device 940.

One or more communication ports 942 may also be included in the computer 906. It will be appreciated by those skilled in the art that more components may be included in the computer 906. For example, several input devices 938 may be included, such as a keyboard, a mouse, a joystick, a touch screen, etc. In addition, several output devices 940 may be included such as a monitor, speakers, a printer, etc. Thus, those skilled in the art will appreciate that additional components may be added to the computer 906 without detracting from the functionality to serve as a computer 906.

The computer 906 may be a conventional desktop computer. Desktop computers are commercially available. However, it will be appreciated by those skilled in the art that the computer 906 is a broadly defined digital computer. A computer 906, as used herein, is any device that includes a digital processor capable of receiving and processing data. A computer 906 includes the broad range of digital computers including microcontrollers, hand-held computers, personal computers, servers, mainframes, supercomputers, and any variation or related device thereof. In current design, the computer 906 is typically an IBM-compatible personal computer running the Linux or Microsoft Windows 95/98/2000 or NT operating system. Of course, other types of computers with different operating systems may be used. For example, an Apple computer or a UNIX workstation may be used as the computer 906.

Figure 10:
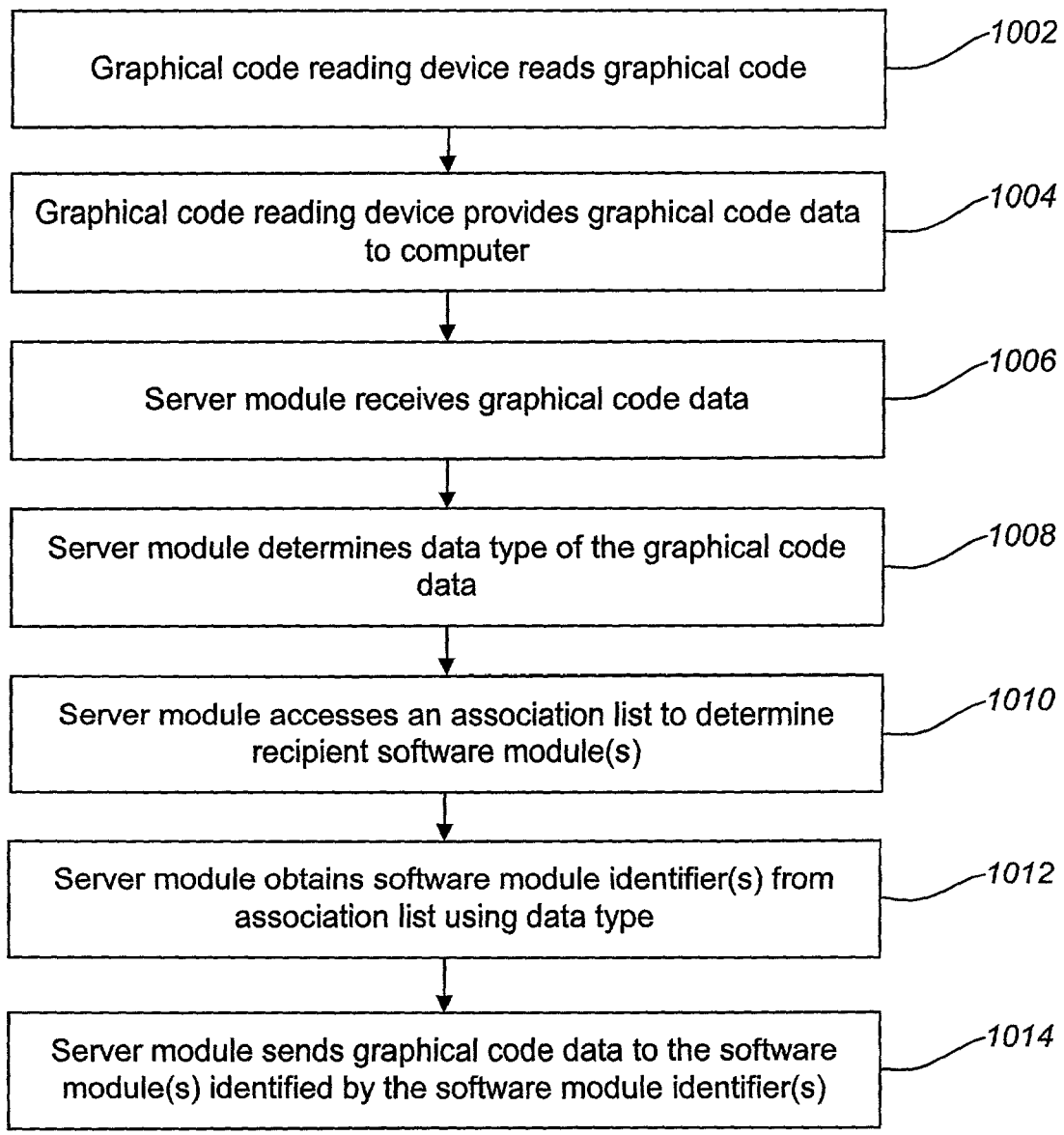
FIG. 10 is a flow diagram of an embodiment of a method for providing graphical code data to a requesting software component.

FIG. 10 illustrates an embodiment of a method for providing graphical code data to a requesting software component. The graphical code reading device 102 reads 1002 graphical code data and then provides 1004 the graphical code data to the computer 106. The server module receives 1006 the graphical code data. Once the server module 210 has the graphical code data, it may determine 1008 the data type of the graphical code data. The server module accesses 1010 an association list 212, 216 to determine whether any software modules have requested the data type. The server module obtains 1012 software module identifiers from the association lists 212, 216 using the data type. Finally, the server module sends 1014 the graphical code data to the software modules identified by the software module identifiers.

Figure 11:
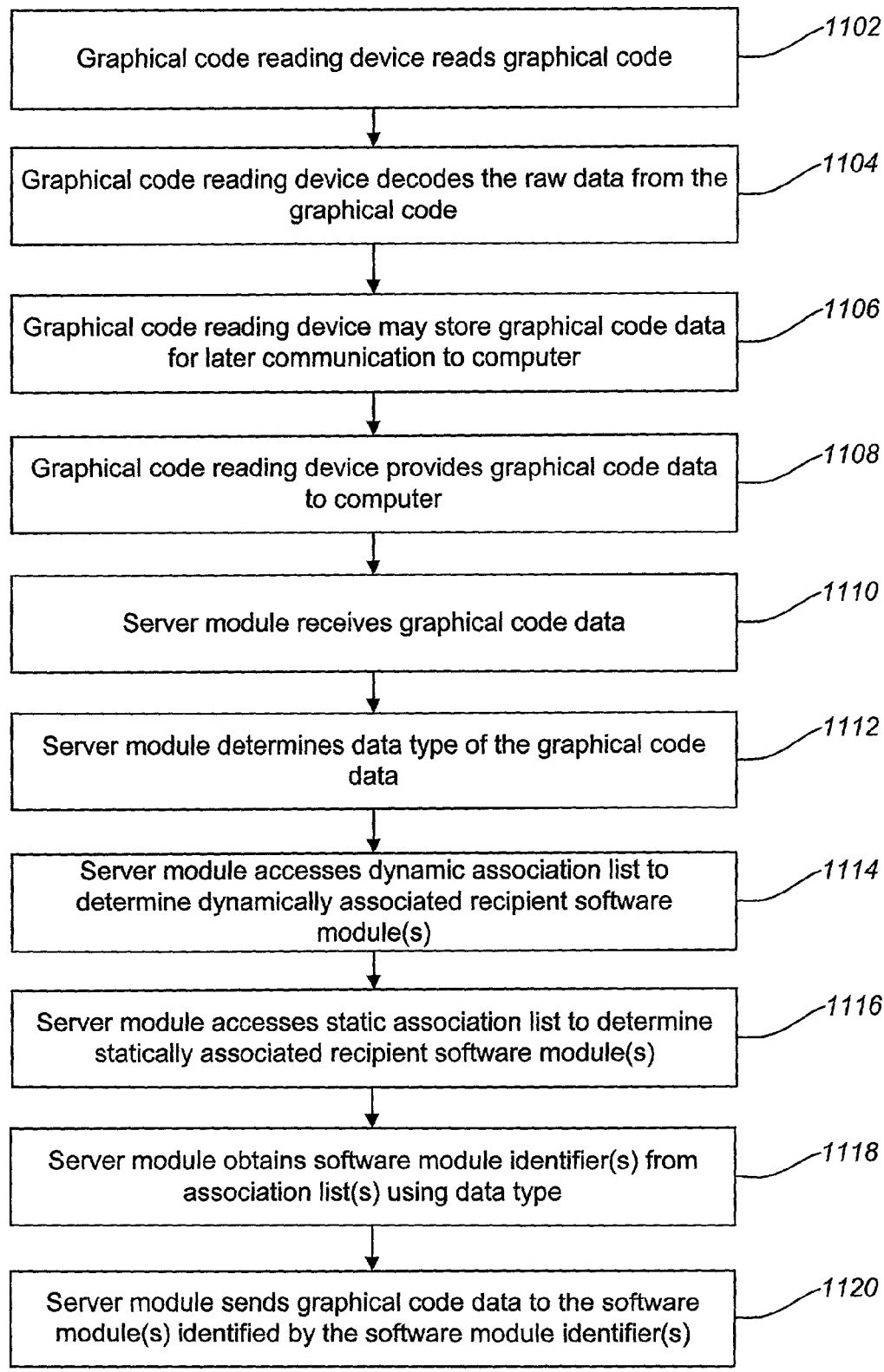
FIG. 11 is a flow diagram of another embodiment of a method for providing graphical code data to a requesting software component.

FIG. 11 illustrates another embodiment of a method for providing graphical code data to a requesting software component and illustrates that various changes can be made by those skilled in the art. The graphical code reading device 102 reads 1102 graphical code data. In the embodiment of FIG. 11, the graphical code reading device then decodes 1104 the raw data from the graphical code. In addition, the graphical code reading device may store 1106 the graphical code data for later communication to the computer 106. For example, an embodiment may be configured to store graphical code data for a certain time period, or until a certain amount of graphical code data is reached, before sending the graphical code data to the computer 106.

The graphical code reading device provides 1108 the graphical code data to the computer 106. The server module receives 1110 the graphical code data. If the graphical code reading device 102 had not decoded 1104 the raw data, the driver 214 or server module 210 may decode the raw data. Once the server module 210 has the graphical code data, it may determine 1112 the data type of the graphical code data.

As illustrated herein, there may be different kinds of association lists. For example, there may be an association list 212 and/or an integrated association list 216. The association list 212 may be a dynamic association list (based on data types desired by currently running applications), and the integrated association list 216 may be a static association list (based on default applications). In an embodiment using both integrated and dynamic association lists 216, 212, the server module accesses 1114 the dynamic association list to determine whether any software modules have requested the data type. In addition, the server module may access 1116 the static association list to determine whether any other software modules are to receive the data type. The server module obtains 1118 software module identifiers from the dynamic and static association lists using the data type. Finally, the server module sends 1120 the graphical code data to the software modules identified by the software module identifiers.

Figure 12:
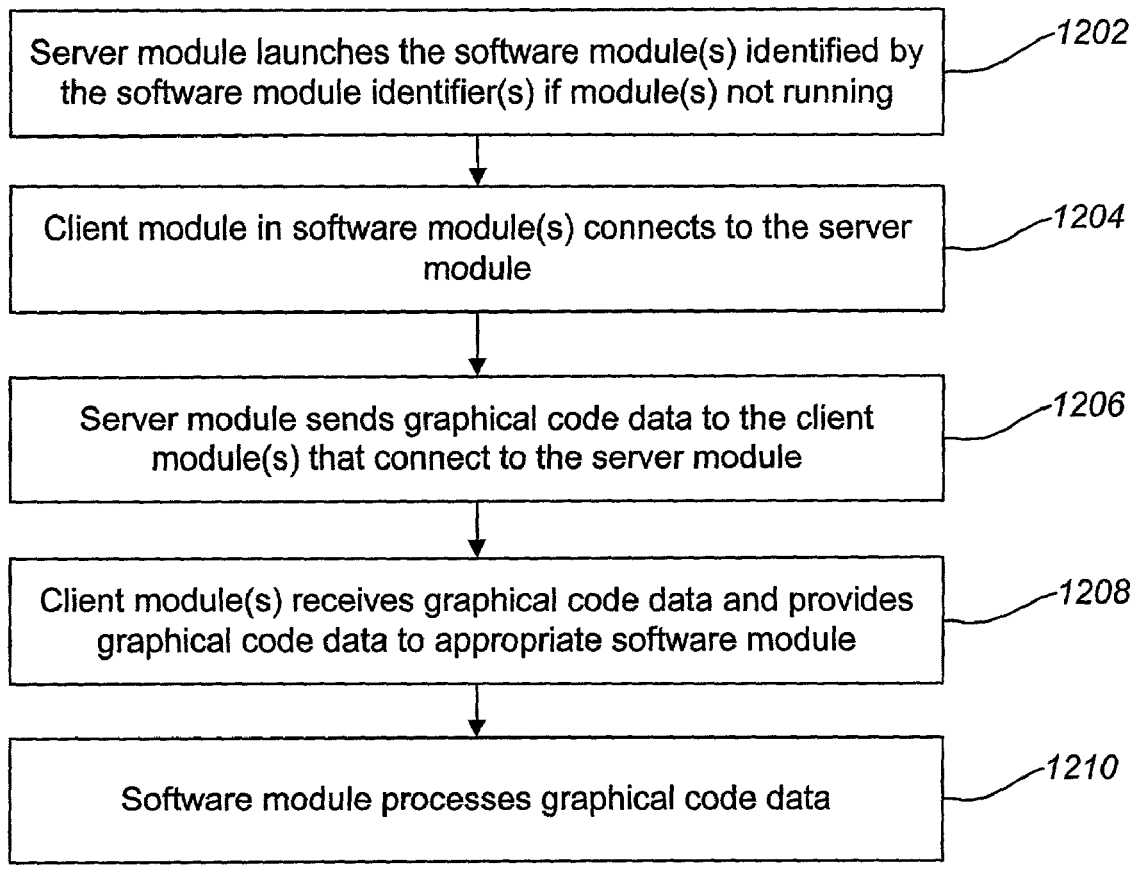
FIG. 12 is a flow diagram of an embodiment for communicating the graphical code data from a server module to a client module.

FIG. 12 illustrates a flow diagram of the communicating of the graphical code data from the server module 210 to the client module(s). If the software module identified by the software module identifier is not running, the server module 210 may launch 1202 the software module. The client module 204 of the software module started connects 1204 to the server module 210 for electronic communication. The server module 210 sends 1206 the graphical code data to the client module 204. The client module 204 receives 1208 the graphical code data and provides the graphical code data to the appropriate software module. One way in which the client module 204 may provide the graphical code data to the appropriate software module is by calling an application-defined callback function that takes appropriate application-specific action. The software module then processes 1210 the graphical code data.

Figure 13:
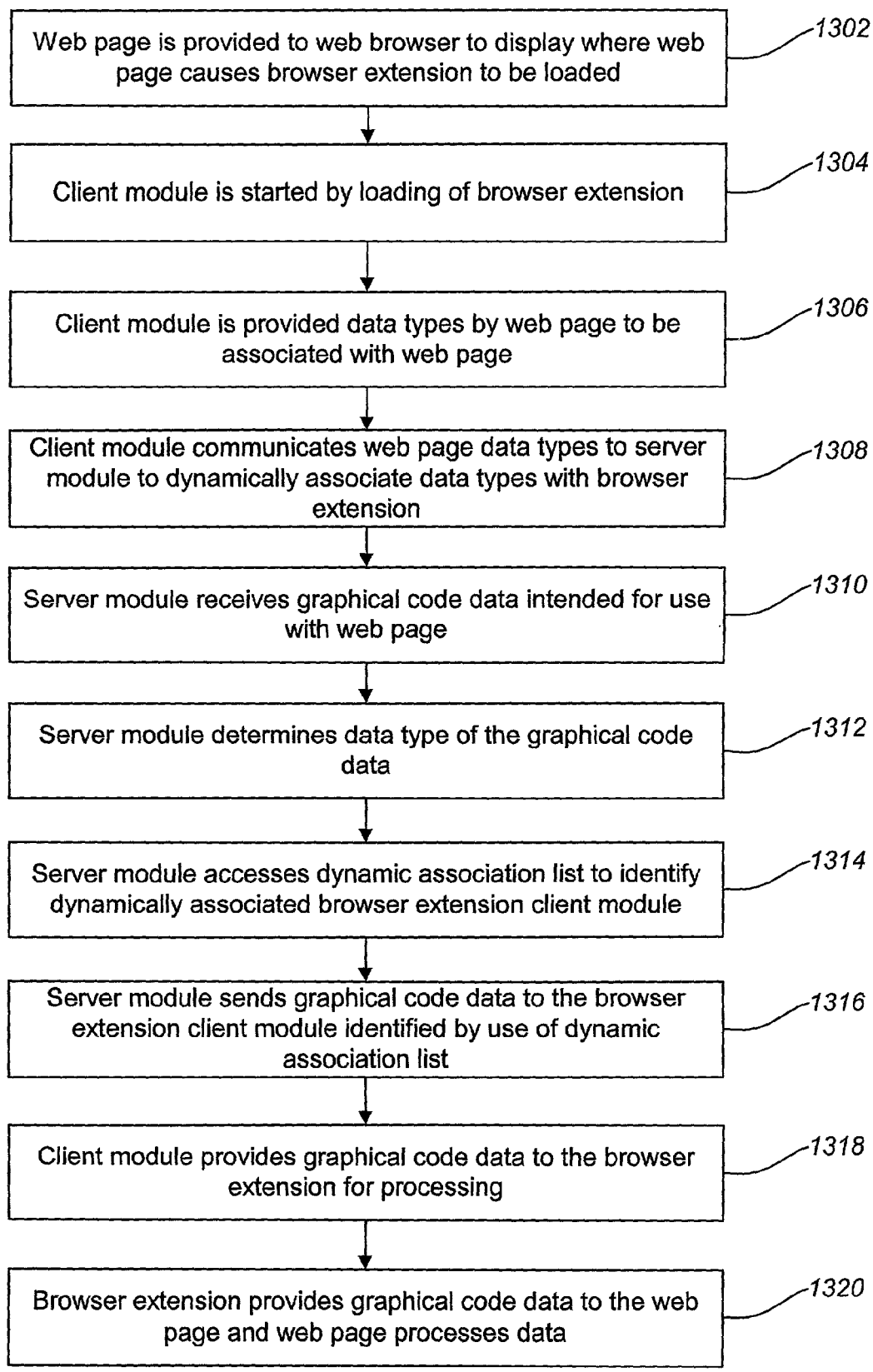
FIG. 13 is a flow diagram of an embodiment for communicating graphical code data to assist in processing a web-related document.

FIG. 13 is a flow diagram illustrating the use of an embodiment to communicate graphical code data to assist in processing a web-related document. Graphical code data may be sent to a web-related document to provide various pieces of data or information including, but not limited to, product numbers, names, addresses, telephone numbers, credit card numbers, billing information, shipping information, submission code, confirmation codes, etc.

The method illustrated in FIG. 13 may be used in combination with the embodiment shown in FIG. 3. A web page 324 is provided 1302 to a web browser 322 for display. The web page 324 may include a component or instructions that cause a browser extension 320 to be loaded. For example, the web page 324 may include a tag that activates the browser extension 320. The client module 304 is started 1304 by the loading of the browser extension 320.

The client module 304 is provided 1306 with data types to be associated with the web page 324 so that the client module 304 may request these data types. The client module 304 may be configured to call a function or functions provided by the web page 324 to return the data types needed. Alternatively, the client module 304 may be configured to examine the web page 324 and determine the types of data to request. Other means may be used to determine what data types to request. For example, the client module 304 may post an event which a script responds to and calls a function of the browser extension 320 to set the data types. The client module 304 communicates 1308 the data types to the server module 210 to dynamically associate the data types with the browser extension 320.

After a user has scanned a graphical code 108 with the graphical code reading device 102, the server module 210 receives 1310 the graphical code data intended for use with the web page 324. The server module 210 determines 1312 the data type of the graphical code data. The server module 210 may then access 1314 the dynamic association list to identify the dynamically associated browser extension module 320. Using the association list, the server module 210 is informed that the browser extension module 320 has requested the data type. The server module 210 then sends 1316 the graphical code data to the browser extension client module 304.

The client module 304 then provides 1318 the graphical code data to the browser extension for processing. One way in which the client module 304 may provide the data to the extension 320 is by calling the browser extension's callback function. The browser extension module 320 provides 1320 the graphical code data to the web page 324 and the web page processes the data. Those skilled in the art will appreciate the various ways in which the graphical code data may be provided to the web page 324. For example, a callback function may pass the data to the web page by (a) calling the web page's corresponding callback script function and passing the data as parameters, (b) posting an event to which the web page script responds by calling a browser extension function to retrieve the data, or (c) posting an event which includes the data as part of the event. Of course, data may be passed to the web page by various other means, as will be appreciated by those skilled in the art. Once the web page 324 receives the data, it takes the appropriate web-page specific action according to the data received, such as filling in fields on a form, submitting a form, loading a frame, refreshing a page, controlling multimedia content, etc.

Those skilled in the art will appreciate that a similar technique to that of using an extension module with a web-page script can be applied to other types of application software; for example, a Microsoft Word document, through a Visual Basic for Applications (VBA) script, can load an extension module containing an embedded client that can receive data read from graphical codes and pass this data to the VBA script for processing in a manner appropriate to the particular document. As another example, the same technique could be applied to a Microsoft PowerPoint presentation to enable it to respond to graphical codes, which could cause a particular slide to be displayed when the graphical code reader reads a particular code.

Sometimes problems may occur when scanning codes for a web page if the user reads another code before the web page has finished loading and the transaction may be lost. A process of serialization may be used to prevent this type of problem. The serialization process may include the following steps. The graphical code containing a serialized URL is read and decoded and passed to the driver software 214. The driver software determines that the data is a URL and sends the data to a web browser to open the URL. If the web browser is not running, the driver software 214 may cause the browser to be launched. The driver software 214 may then wait for the browser to load the web page by waiting for a specific message from the web page or web element that the page has been loading. While the driver 214 is waiting, the browser downloads and displays the web page corresponding to the URL. The web page contains tags to activate the browser extension 320 with a message parameter causing the extension 320 to start the client module 304 and cause the client module 304 to send the message to the driver's 214 server module 210. Once the server module 210 receives the message, it may end its wait step. While the driver's server module is waiting for the message from the client module, the driver may still receive and buffer additional data from the graphical code reading device 102; such data may be processed in turn when the server module ends its wait step.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A system for providing data from a graphical code reading device to a software module, the system comprising:
    a graphical code reading device that scans a graphical code and provides graphical code data; and
    a computer in electronic communication with the graphical code reading device that receives the graphical code data from the graphical code reading device, the computer comprising:
        a processor;
        a memory in electronic communication with the processor;
        a communications port in electronic communication with the processor for communicating with the graphical code reading device;
        an association including a data type and a software module identifier, wherein the data type indicates what type of data is included in the graphical code data; and
        a driver that receives the graphical code data and obtains the software module identifier through use of the data type and provides the graphical code data to the software module identified by the software module identifier.

2. The system as defined in claim 1 wherein the association is included in an association list.

3. The system as defined in claim 2 wherein the association list is created statically.

4. The system as defined in claim 2 wherein the association list is created dynamically.

5. The system as defined in claim 1 wherein the driver includes a server module.

6. The system as defined in claim 5 wherein the server module implements a method comprising:
    receiving the graphical code data;
    determining a data type of the graphical code data;
    obtaining the software module identifier from the association through use of the data type;
    launching the software module identified by the software module identifier if the software module is not running; and
    providing the graphical code data to a client module of the software module.

7. The system as defined in claim 6 wherein the data type of the graphical code data is determined according to the symbology of the graphical code.

8. The system as defined in claim 6 wherein the data type of the graphical code data is determined by examining graphical code data content.

9. The system as defined in claim 1 wherein the graphical code data includes a plurality of data fields.

10. The system as defined in claim 9 wherein one or more of the data fields includes a data type identifier.

11. The system as defined in claim 1 wherein the graphical code data includes a data type identifier.

12. The system as defined in claim 1 wherein the association is included in an association list comprising a plurality of data types and a plurality of software module identifiers.

13. A computer system for providing data from a graphical code reading device to a software module, the computer system comprising:
    a processor;
    a memory in electronic communication with the processor;
    a communications port in electronic communication with the processor for communicating with a graphical code reading device;
    an association including a data type and a software module identifier, wherein the data type indicates what type of data is included in the graphical code data; and
    a driver that receives graphical code data from the graphical code reading device through the communications port and obtains the software module identifier through use of the data type and provides the graphical code data to the software module identified by the software module identifier.

14. The computer system as defined in claim 13 wherein the association is included in an association list.

15. The computer system as defined in claim 14 wherein the association list is created statically.

16. The computer system as defined in claim 14 wherein the association list is created dynamically.

17. The computer system as defined in claim 13 wherein the driver includes a server module.

18. The computer system as defined in claim 17 wherein the server module implements a method comprising:
    receiving the graphical code data;
    determining a data type of the graphical code data;
    obtaining the software module identifier from the association through use of the data type;
    launching the software module identified by the software module identifier if the software module is not running; and
    providing the graphical code data to a client module of the software module.

19. The computer system as defined in claim 13 wherein the graphical code data includes a plurality of data fields.

20. The computer system as defined in claim 18 wherein the data type of the graphical code data is determined according to the symbology of the graphical code.

21. The computer system as defined in claim 18 wherein the data type of the graphical code data is determined by examining graphical code data content.

22. The computer system as defined in claim 19 wherein one or more of the data fields includes a data type identifier.

23. The computer system as defined in claim 13 wherein the graphical code data includes a data type identifier.

24. The computer system as defined in claim 13 wherein the association is included in an association list comprising a plurality of data types and a plurality of software module identifiers.

25. A computer-readable medium for storing program data, wherein the program data comprises executable instructions for implementing a method comprising:

receiving graphical code data from a graphical code reading device in electronic communication with a computer;

determining a data type of the graphical code data, wherein the data type indicates what type of data is included in the graphical code data;

obtaining a software module identifier through use of the data type and through use of an association list;

launching a software module identified by the software module identifier if the software module is not running; and providing the graphical code data to the software module.

26. The medium as defined in claim 25 wherein the association list is created statically.

27. The medium as defined in claim 25 wherein the association list is created dynamically.

28. The medium as defined in claim 25 wherein the graphical code data includes a plurality of data fields.

29. The medium as defined in claim 25 wherein the data type of the graphical code data is determined according to the symbology of the graphical code.

30. The medium as defined in claim 25 wherein the data type of the graphical code data is determined by examining graphical code data content.

31. The medium as defined in claim 28 wherein one or more of the data fields includes a data type identifier.

32. The medium as defined in claim 25 wherein the graphical code data includes a data type identifier.

33. The medium as defined in claim 25 wherein the association list comprises a plurality of data types and a plurality of software module identifiers.

34. A method for providing data from a graphical code reading device to a software module, the method comprising:

receiving graphical code data from a graphical code reading device in electronic communication with a computer;

determining a data type of the graphical code data, wherein the data type indicates what type of data is included in the graphical code data;

obtaining a software module identifier through use of the data type and through use of an association list;

launching a software module identified by the software module identifier if the software module is not running; and providing the graphical code data to the software module.

35. The method as defined in claim 34 wherein the association list is created statically.

36. The method as defined in claim 34 wherein the association list is created dynamically.

37. The method as defined in claim 34 wherein the graphical code data includes a plurality of data fields.

38. The method as defined in claim 34 wherein the data type of the graphical code data is determined according to the symbology of the graphical code.

39. The method as defined in claim 34 wherein the data type of the graphical code data is determined by examining graphical code data content.

40. The method as defined in claim 37 wherein one or more of the data fields includes a data type identifier.

41. The method as defined in claim 34 wherein the graphical code data includes a data type identifier.

42. The method as defined in claim 34 wherein the association list comprises a plurality of data types and a plurality of software module identifiers.

43. A driver for communicating with a graphical code reading device in electronic communication with a computer, the driver comprising:

a server module implementing a method comprising:

receiving graphical code data from the graphical code reading device;

determining a data type of the graphical code data, wherein the data type indicates what type of data is included in the graphical code data;

accessing an association list comprising a data type list and a software module list;

obtaining a software module identifier from the association list through use of the data type and the data type list;

launching the software module identified by the software module identifier if the software module is not running; and providing the graphical code data to a client module of the software module.

44. The driver as defined in claim 43 wherein the association list is created statically.

45. The driver as defined in claim 43 wherein the association list is created dynamically.

46. The driver as defined in claim 43 wherein the graphical code data includes a plurality of data fields.

47. The driver as defined in claim 43 wherein the data type of the graphical code data is determined according to the symbology of the graphical code.

48. The driver as defined in claim 43 wherein the data type of the graphical code data is determined by examining graphical code data content.

49. The driver as defined in claim 43 wherein one or more of the data fields includes a data type identifier.

50. The driver as defined in claim 43 wherein the graphical code data includes a data type identifier.

51. A system for providing data from a graphical code reading device to a software module, the system comprising:

a graphical code reading device that scans a graphical code and provides graphical code data; and a computer in electronic communication with the graphical code reading device that receives the graphical code data from the graphical code reading device, the computer comprising:

a processor;

a memory in electronic communication with the processor;

a communications port in electronic communication with the processor for communicating with the graphical code reading device;

an association list including a plurality of data types and a plurality of software module identifiers;

a first software module including a client module; and a driver that includes a server module, the server module implementing a method comprising:

receiving the graphical code data;

determining a data type of the graphical code data, wherein the data type indicates what type of data is included in the graphical code data;

obtaining a first software module identifier from the association list through use of the data type;

launching the first software module identified by the first software module identifier if the first software module is not running; and providing the graphical code data to the client module of the first software module.

52. A system for providing data from a graphical code reading device to a web page, the system comprising:
- a graphical code reading device that scans a graphical code and provides graphical code data; and
- a computer in electronic communication with the graphical code reading device that receives the graphical code data from the graphical code reading device, the computer comprising:
  - a processor;
  - a memory in electronic communication with the processor;
  - a communications port in electronic communication with the processor for communicating with the graphical code reading device;
  - an association including a data type and a software module identifier, wherein the data type indicates what type of data is included in the graphical code data; and
  - a driver that receives the graphical code data and obtains the software module identifier through use of the data type and provides the graphical code data to a browser extension module identified by the software module identifier and wherein the browser extension module provides the graphical code data to the web page.

53. The system as defined in claim 52 wherein the webpage includes a form having form fields.

54. The system as defined in claim 53 wherein the graphical code data comprises a plurality of data fields that correspond to the form fields and whereby the form is automatically completed.

55. The system as defined in claim 52 wherein the driver providing the graphical code data to the browser extension module is accomplished by the driver sending the graphical code data to a client module embedded in the browser extension module and by the client module calling a browser extension callback function to pass the graphical code data to the browser extension module.

56. The system as defined in claim 52 wherein the browser extension module provides the graphical code data to the web page by calling a callback function in a script contained in the web page.

57. The system as defined in claim 52 wherein the browser extension module provides the graphical code data to the web page by posting an event to the web page, wherein the web page contains a script that responds to the event, and wherein the script obtains the graphical code data by calling a function within the browser extension module.

58. The system as defined in claim 52 wherein the browser extension module provides the graphical code data to the web page by posting an event to the web page, the event including the graphical code data, wherein the web page contains a script that responds to the event.

59. The system as defined in claim 52 wherein a serialization process is used to avoid losing transactions.

60. The system as defined in claim 59 wherein the serialization process includes causing the driver to wait until, a message is sent from the client module to stop the wait.

61. The system as defined in claim 52 wherein the browser extension module is started by a tag embedded in the web page.

62. A computer system for providing data from a graphical code reading device to a web page, the computer system comprising:
- a processor;
- a memory in electronic communication with the processor;
- a communications port in electronic communication with the processor for communicating with a graphical code reading device;
- an association including a data type and a software module identifier, wherein the data type indicates what type of data is included in the graphical code data; and
- a driver that receives graphical code data from the graphical code reading device through the communications port and obtains the software module identifier through use of the data type and provides the graphical code data to a browser extension module identified by the software module identifier, the browser extension module operating to provide the graphical code data to the web page.

63. The computer system as defined in claim 62 wherein the web page includes a form having form fields.

64. The computer system as defined in claim 63 wherein the graphical code data comprises a plurality of data fields that correspond to the-form fields and whereby the form is automatically completed.

65. The computer system as defined in claim 62 wherein the driver providing the graphical code data to the browser extension module is accomplished by the driver sending the graphical code data to a client module embedded in the browser extension module and by the client module calling a browser extension callback function to pass the graphical code data to the browser extension module.

66. The computer system as defined in claim 62 wherein the browser extension module provides the graphical code data to the web page by calling a callback function in a script contained in the web page.

67. The computer system as defined in claim 62 wherein the browser extension module provides the graphical code data to the web page by posting an event to the web page, wherein the web page contains a script that responds to the event, and wherein the script obtains the graphical code data by calling a function within the browser extension module.

68. The computer system as defined in claim 62 wherein the browser extension module provides the graphical code data to the web page by posting an event to the web page, the event including the graphical code data, wherein the web page contains a script that responds to the event.

69. The computer system as defined in claim 62 wherein a serialization process is used to avoid losing transactions.

70. The computer system as defined in claim 69 wherein the serialization process includes causing the driver to wait until a message is sent from the client module to stop the wait.

71. The computer system as defined in claim 62 wherein the browser extension module is started by a tag embedded in a web page.

72. A method for providing data from a graphical code reading device to a web page, the method comprising:
- receiving graphical code data from a graphical code reading device in electronic communication with a computer;
- determining a data type of the graphical code data, wherein the data type indicates what type of data is included in the graphical code data;
- obtaining a software module identifier through use of the data type and through use of an association list;
- launching a web browser identified by the software module identifier if the web browser is not running; and
- providing the graphical code data to a web page opened by the web browser.

73. The method as defined in claim 72 wherein the web page includes a form having form fields.

74. The method as defined in claim 73 further comprising completing the form through use of the graphical code data that further comprises a plurality of data fields that correspond to the form fields.

75. The method as defined in claim 72 further comprising sending the graphical code data to a client module embedded in a browser extension module.

76. The method as defined in claim 75 further comprising passing the graphical code data to the browser extension module by calling a browser extension callback function.

77. The method as defined in claim 75 wherein the browser extension module provides the graphical code data to the web page by calling a callback function in a script contained in the web page.

78. The method as defined in claim 75 wherein the browser extension module provides the graphical code data to the web page by posting an event to the web page, wherein the web page contains a script that responds to the event, and wherein the script obtains the graphical code data by calling a function within the browser extension module.

79. The method as defined in claim 75 wherein the browser extension module provides the graphical code data to the web page by posting an event to the web page, the event including the graphical code data, wherein the web page contains a script that responds to the event.

80. A system for providing data from a graphical code reading device to an extensible application, the system comprising:
a graphical code reading device that scans a graphical code and provides graphical code data; and
a computer in electronic communication with the graphical code reading device that receives the graphical code data from the graphical code reading device, the computer comprising:
a processor;
a memory in electronic communication with the processor;
a communications port in electronic communication with the processor for communicating with the graphical code reading device;
an association including a data type and a software module identifier, wherein the data type indicates what type of data is included in the graphical code data; and
a driver that receives the graphical code data and obtains the software module identifier through use of the data type and provides the graphical code data to an extension module of the extensible application identified by the software module identifier.

81. The system as defined in claim 80 wherein the extensible application is a web browser and wherein the extension module is a browser extension module.

82. The system as defined in claim 80 wherein the graphical code data comprises a plurality of data fields.

83. The system as defined in claim 80 wherein the driver providing the graphical code data to the extension module is accomplished by the driver sending the graphical code data to a client module embedded in the extension module.

84. The system as defined in claim 83 wherein a serialization process is used to avoid losing transactions.

85. The system as defined in claim 84 wherein the serialization process includes causing the driver to wait until a message is sent from the client module to stop the wait.

86. A computer system for providing data from a graphical code reading device to an extensible application, the computer system comprising:
a processor;
a memory in electronic communication with the processor;
a communications port in electronic communication with the processor for communicating with a graphical code reading device;
an association including a data type and a software module identifier, wherein the data type indicates what type of data is included in the graphical code data; and
a driver that receives graphical code data from the graphical code reading device through the communications port and obtains the software module identifier through use of the data type and provides the graphical code data to an extension module identified by the software module identifier.

87. The computer system as defined in claim 86 wherein the extensible application is a web browser and wherein the extension module is a browser extension module.

88. The computer system as defined in claim 86 wherein the graphical code data comprises a plurality of data fields.

89. The computer system as defined in claim 86 wherein the driver providing the graphical code data to the extension module is accomplished by the driver sending the graphical code data to a client module embedded in the extension module.

90. The computer system as defined in claim 89 wherein a serialization process is used to avoid losing transactions.

91. The computer system as defined in claim 90 wherein the serialization process includes causing the driver to wait until a message is sent from the client module to stop the wait.

92. A method for providing data from a graphical code reading device to an extensible application, the method comprising:
receiving graphical code data from a graphical code reading device in electronic communication with a computer;
determining a data type of the graphical code data, wherein the data type indicates what type of data is included in the graphical code data;
obtaining a software module identifier through use of the data type and through use of an association list;
launching the extensible application identified by the software module identifier if the extensible application is not running; and
providing the graphical code data to an extension module of the extensible application.

93. The method as defined in claim 92 wherein the graphical code data further comprises a plurality of data fields.

94. The method as defined in claim 92 wherein the data type of the graphical code data is determined according to the symbology of the graphical code.

95. The method as defined in claim 92 wherein the data type of the graphical code data is determined by examining graphical code data content.

96. The method as defined in claim 93 wherein one or more of the data fields includes a data type identifier.

97. The method as defined in claim 92 wherein the graphical code data includes a data type identifier.

98. The method as defined in claim 92 further comprising sending the graphical code data to a client module embedded in the extension module.

* * * * *

UNITED STATES PATENT AND TRADEMARK OFFICE
CERTIFICATE OF CORRECTION

PATENT NO. : 7,072,974 B2  Page 1 of 1
APPLICATION NO. : 10/006439
DATED : July 4, 2006
INVENTOR(S) : Paul J. Hepworth et al.

It is certified that error appears in the above-identified patent and that said Letters Patent is hereby corrected as shown below:

In Column 1, line 7, please replace "related tog" with --related to--.
In Column 7, line 66, please replace "is reading" with --reading--.
In Column 15, line 27, please replace "webpage" with --web page--.
In Column 15, line 59, please replace "until, a" with --until a--.
In Column 16, line 21, please replace "the-form" with --the form--.

Signed and Sealed this

Twelfth Day of December, 2006

JON W. DUDAS
*Director of the United States Patent and Trademark Office*